United States Patent
Ginosar et al.

(10) Patent No.: US 7,691,270 B2
(45) Date of Patent: Apr. 6, 2010

(54) METHOD FOR REMOVING IMPURITIES FROM AN IMPURITY-CONTAINING FLUID STREAM

(75) Inventors: Daniel M. Ginosar, Idaho Falls, ID (US); Robert V. Fox, Idaho Falls, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 1024 days.

(21) Appl. No.: 11/181,211

(22) Filed: Jul. 13, 2005

(65) Prior Publication Data

US 2007/0012621 A1    Jan. 18, 2007

(51) Int. Cl.
*C07C 51/00* (2006.01)
*A23L 1/28* (2006.01)

(52) U.S. Cl. .............. 210/634; 554/169; 554/170; 426/417; 426/426; 426/429; 426/478

(58) Field of Classification Search ......... 210/634–639; 208/131, 132, 95, 44, 212; 554/169, 9–21, 554/170, 227; 426/425, 429, 430, 432, 417, 426/426, 478; 44/338
See application file for complete search history.

(56) References Cited

U.S. PATENT DOCUMENTS

| | | | |
|---|---|---|---|
| 3,436,344 A | 4/1969 | Canning et al. | |
| 4,164,506 A | 8/1979 | Kawahara et al. | |
| 4,466,923 A * | 8/1984 | Friedrich | ........... 554/8 |
| 4,695,411 A | 9/1987 | Stern et al. | |
| 4,698,186 A | 10/1987 | Jeromin et al. | |
| 4,792,418 A | 12/1988 | Rubin et al. | |
| 4,839,287 A | 6/1989 | Holmberg et al. | |
| 5,124,026 A * | 6/1992 | Taylor et al. | ........... 208/309 |
| 5,219,744 A | 6/1993 | Kurashige et al. | |
| 5,242,578 A * | 9/1993 | Taylor et al. | ........... 208/309 |
| 5,288,619 A | 2/1994 | Brown et al. | |

(Continued)

FOREIGN PATENT DOCUMENTS

JP    63-112536    5/1988

(Continued)

OTHER PUBLICATIONS

International Search Report dated Nov. 4, 1999 (2 pages).

(Continued)

*Primary Examiner*—Ana M Fortuna
(74) *Attorney, Agent, or Firm*—TraskBritt

(57) ABSTRACT

A method of removing at least one polar component from a fluid stream. The method comprises providing a fluid stream comprising at least one nonpolar component and at least one polar component. The fluid stream is contacted with a supercritical solvent to remove the at least one polar component. The at least one nonpolar component may be a fat or oil and the at least one polar component may be water, dirt, detergents, or mixtures thereof. The supercritical solvent may decrease solubility of the at least one polar component in the fluid stream. The supercritical solvent may function as a solvent or as a gas antisolvent. The supercritical solvent may dissolve the nonpolar components of the fluid stream, such as fats or oils, while the polar components may be substantially insoluble. Alternatively, the supercritical solvent may be used to increase the nonpolarity of the fluid stream.

22 Claims, 1 Drawing Sheet

U.S. PATENT DOCUMENTS

| | | | |
|---|---|---|---|
| 5,424,466 | A | 6/1995 | Stern et al. |
| 5,424,467 | A | 6/1995 | Bam et al. |
| 5,480,787 | A | 1/1996 | Negishi et al. |
| 5,481,058 | A | 1/1996 | Blackwell et al. |
| 5,520,708 | A | 5/1996 | Johnson et al. |
| 5,525,126 | A | 6/1996 | Basu et al. |
| 5,578,090 | A | 11/1996 | Bradin |
| 5,599,358 | A | 2/1997 | Giavazzi et al. |
| 5,697,986 | A | 12/1997 | Haas |
| 5,713,965 | A | 2/1998 | Foglia et al. |
| 5,759,549 | A * | 6/1998 | Hiltunen et al. ............... 554/8 |
| 5,783,243 | A * | 7/1998 | Benado .................... 426/425 |
| 6,201,144 | B1 | 3/2001 | Isbell et al. |
| 6,211,390 | B1 * | 4/2001 | Peter et al. ................. 554/170 |
| 6,288,251 | B1 | 9/2001 | Tsuto et al. |
| 6,399,800 | B1 | 6/2002 | Haas et al. |
| 6,524,469 | B1 * | 2/2003 | Schucker .................... 208/95 |
| 6,537,787 | B1 * | 3/2003 | Breton ...................... 435/134 |
| 6,570,030 | B2 | 5/2003 | Goto et al. |
| 6,712,867 | B1 | 3/2004 | Boocock |
| 6,800,316 | B1 * | 10/2004 | Perrut et al. ............... 426/417 |
| 6,884,900 | B2 * | 4/2005 | Maeda et al. ............... 554/169 |
| 6,887,283 | B1 * | 5/2005 | Ginosar et al. ............... 44/388 |
| 2004/0087809 | A1 | 5/2004 | Nakayama et al. |
| 2007/0012621 | A1 | 1/2007 | Ginosar et al. |
| 2007/0282119 | A1 | 12/2007 | Matson et al. |

FOREIGN PATENT DOCUMENTS

| | | |
|---|---|---|
| JP | 07-062385 | 3/1995 |
| JP | 09-157684 | 12/1995 |
| JP | 2000-270886 | 3/1999 |
| WO | WO 00/05327 | 2/2000 |

OTHER PUBLICATIONS

Bernard et al., "Internal Mass Transfer Limitation During Enzymatic Esterification in Supercritical Carbon Dioxide and Hexane, Biocatalysis and Biotransformation," vol. 12, (1995) pp. 299-308.

Cernia et al., "Lipases in Supercritical Fluids," Lipases PT B Methods in Enzymology, vol. 286, pp. 495-508 (1997).

Cernia et al. "The Role of the Reastion Medium in Lipase-catalyzed Esterifications and Transesterificatins," Chemistry and Physicas of Lipids, vol. 93, Nos. 1-2, pp. 157-168, Jun. 1998.

Chi et al., "Enzymatic Interesterification in Supercritical Carbon-dioxide," Agricultural and Biological Chemistry, vol. 52, No. 6, pp. 1541-1550, Jun. 1988.

Colombie et al., "Water Activity Control: A Way To Improve the Efficiency of Continuous Lipase Esterification," Biotechnology And Bioengineering, vol. 60, No. 3, pp. 362-368, Nov. 5, 1998.

Demirbas, Ayhan, "Biodiesel from vegetable oils via transesterification in supercritical methanol," Energy Conversion and Management 43 (2002) 2349-2356.

Demirbas, Ayhan, "Biodiesel fuels from vegetable oils via catalytic and non-catalytic supercritical alcohol transesterifications and other methods: a survey," Energy Conversion and Management 44 (2003) 2093-2109.

Dumont et al., "Continuous Synthesis of Ethyl Myristate By Enzymatic Reaction in Supercritical Carbon Dioxide," Journal of Supercritical Fluids, vol. 6, No. 2, pp. 85-89, Jun. 1993.

Fangrui et al., "Biodiesel Production: A Review," Bioresource Technology, vol. 70, No. 1, pp. 1-15, Oct. 1999.

Fukuda et al., "Biodiesel Fuel Production by Transesterification of Oils," Journal of Bioscience and Bioengineering, vol. 92, No. 5, 405-416, 2001.

Gunnlaugsdottir et al., "Process Parameters Influencing Ethanolysis of Cod Liver Oil in Supercritical Carbon Dioxide," Journal of Supercritical Fluids, vol. 12, No. 1, pp. 85-93, Mar. 15, 1998.

Gunnlaugsdottir et al., "Alcoholysis and Glyceride Synthesis with Immobilized Lipase on Controlled-pore Glass of Varying Hydrophobicity in Supercritical Carbon Dioxide," Enzyme and Microbial Technology, vol. 22, No. 5, pp. 360-367, Apr. 1998.

Hrnjez et al. "Enzymatic Esterification of 1,2-Butanediol and 1,3 Butanediol in Supercritical Carbon-Dioxide Reaction Rate, Regioselectivity, and Stereoselectivity as a Function of Pressure," Abstracts of Papers of the American Chemical Society 207:315-ORGN. Part 2 Mar. 13, 1994.

Habulin et al., "Synthesis of Oleic Acid Esters Catalyzed by Immobilized Lipase," Journal of Agricultural and Food Chemistry, vol. 44, No. 1, pp. 338-342, Jan. 1996.

Hyatt, John A., "Liquid and Supercritical Carbon Dioxide as Organic Solvents," Journal of Organic Chemistry, vol. 49, No. 26, pp. 5097-5101, 1984.

Ikariya et al., "Chemical Reactions in Supercritical Fluids," Journal of Synthetic Organic Chemistry Japan, vol. 53, No. 5, pp. 358-369, May 1995.

Ikushima, Yutaka, "Supercritical Fluids: An Interesting Medium for Chemical and Biochemical Processes, Advances in Colloid and Interface Science," vol. 71-71, 259-280, Sep. 1, 1997.

Ikushima et al., Promotion of A Lipase-Catalyzed Esterification In Supercritical Carbon Dioxide In The Near-Critical Region, Chemical Engineering Science vol. 51, No. 11, pp. 2817-2822, Jun. 1996.

Ikushima et al., "Promotion of Lipase-catalyzed Esterification of N-Valeric Acid and Citronellol In Supercritical Carbon Dioxide in the Near-critical Region," Journal of Chemical Engineering of Japan, vol. 29, No. 3, pp. 551-553, Jun. 1996.

Jackson, et al., "Methanolysis of Seed Oils in Flowing Supercritical Dioxide," Journal of the American Oil Chemists Society, vol. 73, No. 3 (1996).

Kiran et al. "Supercritical Fluid Engineering Science Fundamentals and Applications," pp. 200-219.

Knez et al., "Enzyme Catalyzed Reactions in Dense Gases," vol. 14, No. 1, pp. 17-29, Oct. 1, 1998.

Knez et al, "Enzymatic Synthesis of Oleyl Oleate in Dense Fluids, " Journal of the American Oil Chemists Society, vol. 72, No. 11, Nov. 1995, pp. 1345-1349.

Knez et al., "Lipase Catalysed Esterification At High Pressure," Biotechnology and Bioengineering, vol. 9, (1994) pp. 115-121.

Krmelj et al., "Lipase-catalyzed synthesis of Oleyl Oleate in Pressurized and Supercritical Solvents," FETT-LIPID, vol. 101, No. 1, pp. 34-38, Jan. 1999.

Kusdiana et al., "Kinetics of transesterification in rapeseed oil to biodiesel fuel as treated in supercritical methanol," Fuel 80 (2001) 693-698.

Lopez-Belmonte et al., "Enantioselective Esterification of 2-Arylpropionic Acids Catalyzed By Immobilized Rhizomucor Miehei Lipase," Journal of Organic Chemistry, vol. 62, No. 6, pp. 1831-1840, Mar. 21, 1997.

March, Jerry, "Advanced Organic Chemistry, Reactions, Mechanisms, and Structure," 4th Edition, John Wiley & Sons, 1992, pp. 393-396.

Marty et al., "Kinetics of Lipase-Catalyzed Esterification in Supercritical CO2," Biotechnology and Bioengineering, vol. 39, pp. 273-280 (1992).

Marty et al., "Continuous Reaction-Separation Process for Enzymatic Esterification in Supercritical Carbon Dioxide," Biotechnology and Bioengineering, vol. 43, No. 6, pp. 497-504, Mar. 15, 1994.

Marty et al., "Comparison of Lipase-catalysed Esterification in Supercritical Carbon Dioxide and in n-Hexane," Biotechnology Letters, vol. 12, No. 1, pp. 11-16, Jan. 1990.

McDaniel et al., "Esterification of Decanoic Acid During Supercritical Fluid Extraction Employing Either Methanol-modified Carbon Dioxide or a Methanol Trap," Journal of Chromatography, vol. 858, No. 2, pp. 201-207, Oct. 15, 1999.

Mensah et al., "Adsorptive Control of Water in Esterification with Immobilized Enzymes: I. Batch Reactor Behavior," Biotechnology and Bioengineering, vol. 60, No. 4, pp. 434-444, Nov. 20, 1998.

Mesiano et al., Chemical Reviews, vol. 99, No. 2, pp. 623-633, Feb. 1999.

Michor et al., "Enzymatic Catalysis in Supercritical Carbon Dioxide: Comparison of Different Lipases and a Novel Esterase," Biotechnology Letters, vol. 18, No. 1, pp. 79-84, Jan. 1996.

Mori et al., "Biocatalytic Esterification in Supercritical Carbon Dioxide by Using a Lipid-coated Lipase," Chemistry Letters, vol. 9, 921-922, Sep. 1998.

Murakata et al., "Esterification Activity of Lipasse Entrapped in Reverse Micelles Formed in Liquefied Gas," Journal of Chemical Engineering of Japan, vol. 29, No. 2, pp. 277-281, Apr. 1996.

Nilsson et al., "Solubilities of Mehtyl Oleate, Oleic Acid, Oleyl Glycerols, and Oleyl Glycerol Mixtures in Supercritical Carbon Dioxide," Journal of the American Oil Chemists Society, JAOCS, vol. 68, No. 2, Feb. 1991, pp. 87-91.

Pasta et al., "Subtilisin-catalyzed Transesterification in Supercritical Carbon Dioxide," Biotechnology Letters, vol. 11, No. 9, pp. 643-648 (1989).

Saka et al., "Biodiesel fuel from rapeseed oil as prepared in supercritical methanol," Fuel 80 (2001) 225-231.

Sarkari et al., "Enzymatic Catalysis in Cosolvent Modified Pressurized Organic Solvents," Biotechnology and Bioengineering, vol. 65, No. 3, pp. 258-264, Nov. 5, 1999.

Stamatis et al, "Studies on the Enzymatic Synthesis of Sugar Esters in Organic Medium and Supercritical Carbon Dioxide," Chemical and Biochemical Engineering Quarterly, vol. 12, No. 3, pp. 151-156. Sep. 1998.

Savage et al., "Reactions at Supercritical Conditions: Applications and Fundamentals," Aiche Journal, vol. 41, No. 7, pp. 1723-1778, Jul. 1995.

Stransky et al., "Simple Quantitative Transesterification of Lipids," FETT-LIPID, vol. 98, No. 2, 65-71, Feb. 1996.

Subramaniam et al., "Reactions in Supercritical Fluids—A Review," Industrial & Engineering Chemistry Process Design and Development, vol. 25, No. 1, 1-12, Jan. 1986.

Vieville et al, "Esterification of Oleic Acid by Methanol Catalyzed by p-Toluenesulfonic Acid and the Cation-Exchange Resins K2411 and K1481 in Supercritical Carbon Dioxide," Industrial & Engineering Chemistry Research, vol. 32, No. 9, pp. 2065-2068. Sep. 1993.

Vija et al, "Lipase-catalysed Esterification in Supercritical Carbon Dioxide and In Hexane," Bioorganic & Medicinal Chemistry Letters, vol. 7, No. 3, pp. 259-262, 1997.

Wu et al., "Enhancement of Enantioselectivity by Altering Alcohol Concentration for Esterification in Supercritical CO2," Journal of Chemical Engineering of Japan, vol. 32, No. 3, pp. 338-340, Jun. 1999.

Yahya et al., "Ester Synthesis in Lipase-catalyzed Reactions," Enzyme and Microbial Technology, vol. 23, Nos. 7-8, pp. 438-450, Dec. 15, 1998.

Yoon et al., "Transesterification between Triolein and Ethylbehenate by Immobilized Lipase in Supercritical Carbon Dioxide," Journal of Fermentation and Bioengineering, vol. 82, No. 4, 334-340, Jun. 1996.

Yu et al., "Enzymatic Esterification of Fatty Acid Mixtures from Milk Fat and Anhydrous Milk Fat with Canola Oil in Supercritical Carbon Dioxide," Biotechnology Progress, 1992, vol. 8 No. 6, 508-513.

Yu et al., "Enzymatic Reaction in Supercritical Fluid Carbon Dioxide Using Dry-Ice," Journal of the Chinese Chemical Society, vol. 46, No. 5, pp. 647-650, Oct. 1999.

U.S. Appl. No. 11/123,607, filed May 6, 2005, entitled "Production of Biodiesel Using Expanded Gas Solvents," inventors Ginosar et al.

Gunnlaugsdottir et al., "Lipase-Catalyzed Alcoholysis with Supercritical Carbon Dioxide Extraction 2: Phase Behavior," Journal of the American Oil Chemists Society, vol. 74, No. 11, pp. 1491-1494, Nov. 1997.

PCT International Search Report and Written Opinion of the International Searching Authority for PCT/US09/57188, dated Nov. 30, 2009, 8 pages.

* cited by examiner

METHOD FOR REMOVING IMPURITIES FROM AN IMPURITY-CONTAINING FLUID STREAM

GOVERNMENT RIGHTS

This invention was made with government support under Contract Nos. DE-AC07-99ID13727 and DE-AC07-05ID14517 awarded by the United States Department of Energy. The government has certain fights in the invention.

CROSS-REFERENCE TO RELATED APPLICATION

This application is related to co-pending U.S. patent application Ser. No. 11/123,607 entitled PRODUCTION OF BIODIESEL USING EXPANDED GAS SOLVENTS, filed on May 6, 2005, now U.S. Pat. No. 7,514,575, issued Apr. 7, 2009, assigned to the Assignee of the present application, the disclosure of which is incorporated by reference herein in its entirety.

FIELD OF THE INVENTION

The present invention relates to a method of removing impurities from a feedstock stream or a product stream. More specifically, the present invention relates to a method of removing polar impurities from a fluid stream that is used to produce biodiesel or a biodiesel product stream.

BACKGROUND OF THE INVENTION

Biodiesel has been the subject of much investigation as an alternative for petroleum diesel fuel. As used herein, the term "biodiesel" refers to an ester-based fuel oxygenate that is derived from a biological source. The biodiesel is used as an alternative for, or as an additive to, petroleum diesel fuel in automobiles or other vehicles. The biodiesel is typically produced from a triglyceride starting material or a fatty acid starting material by a transesterification reaction or an esterification reaction, respectively. Generally, the triglyceride is reacted, or transesterified, with an alcohol to produce glycerol (also known as glycerin) and a corresponding alkyl ester of the triglyceride. Similarly, the fatty acid is reacted, or esterified, with an alcohol to produce a corresponding alkyl ester of the fatty acid. The triglyceride or fatty acid starting materials are available from various sources, such as from pure or used fats or oils. These fats or oils are typically hydrophobic and water-insoluble. In addition to including the triglyceride or fatty acid, the fats or oils include free fatty acids, phospholipids, sterols, water, dirt, detergents, polar compounds, or other impurities. These sources of the fats or oils are too viscous to be used directly as the biodiesel fuel and, therefore, the triglycerides or fatty acids are transesterified or esterified to produce the corresponding alkyl ester, which has a lower viscosity than that of the source of the starting material. The transesterification of the triglyceride (or the esterification of the fatty acid) is conducted with an excess of the alcohol in the presence of a catalyst. As the reaction proceeds, two phases form. One phase includes the alkyl ester and the other phase includes the glycerol. The two phases are allowed sufficient time to settle before additional processing is conducted to purify the alkyl ester from the glycerol.

To produce high quality biodiesel, the source of the triglyceride or fatty acid starting material should include a minimal amount of water. The water, if present, reacts with the free fatty acids and the catalyst to form soap. Water also inhibits the equilibrium of the transesterification or esterification reaction. The soap also increases the viscosity of the alkyl ester, decreases the yield of the alkyl ester, decreases the quality of the alkyl ester, decreases the ability to separate the alkyl ester from the glycerol, consumes the catalyst, decreases the efficiency of the catalyst, and forms gels. The triglyceride or fatty acid starting material should also include a minimal amount of other impurities, such as nonpolar impurities. If present, these nonpolar impurities reduce the effectiveness and stability of the catalyst or decrease the quality of the reaction products. While using pure or refined fats or oils as the starting material avoids these problems, the pure fats or oils are expensive and add considerable expense to the cost of producing the alkyl ester. Used fats or oils, such as those generated by households or the food service industry, are less expensive but typically contain higher amounts of water. Water is also produced as a byproduct of the esterification reaction or is introduced into a product stream by water washing of the alkyl ester. Since the water affects the quality of the alkyl ester, the water must be removed before using the alkyl ester for its intended purpose.

The water is typically removed by distillation, evaporization, lyophilization, use of an inert gas, or use of a drying agent, such as a molecular sieve. For instance, the feedstock stream or the product stream is heated above the boiling point of water to evaporate the water or is heated to distill and condense the water. However, since these techniques consume considerable amounts of energy or use expensive and toxic compounds, many of these techniques are not economical.

It would be desirable to remove the water and other polar impurities from the feedstock stream or the product stream to produce a feedstock stream or a product stream free from the impurities.

BRIEF SUMMARY OF THE INVENTION

The present invention relates to a method of removing impurities from a stream. As used herein, the term "stream" refers to a fluid stream including at least one impurity or at least one polar component, such as a liquid stream including at least one impurity or at least one polar component. The method comprises providing a nonpolar stream comprising at least one impurity, contacting the nonpolar stream with a supercritical solvent, and removing the at least one impurity from the nonpolar stream. The nonpolar stream may be a feedstock stream, such as a fat or an oil feedstock stream, or a product stream that comprises at least one alkyl ester. The supercritical solvent may be maintained at or near its critical point. Contacting the nonpolar stream with the supercritical solvent may decrease solubility of the at least one impurity in the nonpolar stream. The supercritical solvent may be used as a solvent or as a gas antisolvent. In its capacity as the solvent, the supercritical solvent may be used to dissolve nonpolar components of the nonpolar stream, such as fats or oils, while polar components of the nonpolar stream, such as water, dirt, or detergents, may be substantially insoluble in the supercritical solvent. In its capacity as the gas antisolvent, the supercritical solvent may be used to increase the nonpolarity of the nonpolar stream. The at least one impurity may be separated from nonpolar components of the nonpolar stream. The at least one impurity may be water, dirt, detergents, or mixtures thereof.

The present invention also relates to a method of removing at least one polar component from a stream. The method comprises providing a stream comprising at least one nonpolar component and at least one polar component, contacting the stream with a supercritical solvent, and removing the at least one polar component from the stream. The at least one nonpolar component of the stream may be a fat or oil and the at least one polar component may be water, dirt, detergents, or mixtures thereof. The supercritical solvent may decrease solubility of the at least one polar component in the stream. The supercritical solvent may function as a solvent in that the at least one nonpolar component is dissolved by the supercritical solvent while the at least one polar component is substantially insoluble in the supercritical solvent. The supercritical solvent may also function as a gas antisolvent in that the supercritical solvent increases the nonpolarity of the stream. The supercritical solvent may be maintained at or near its critical point to remove the at least one polar component.

BRIEF DESCRIPTION OF THE SEVERAL VIEWS OF THE DRAWINGS

While the specification concludes with claims particularly pointing out and distinctly claiming that which is regarded as the present invention, the advantages of this invention may be more readily ascertained from the following description of the invention when read in conjunction with the accompanying drawings in which:

DETAILED DESCRIPTION OF THE INVENTION

Figure 1:
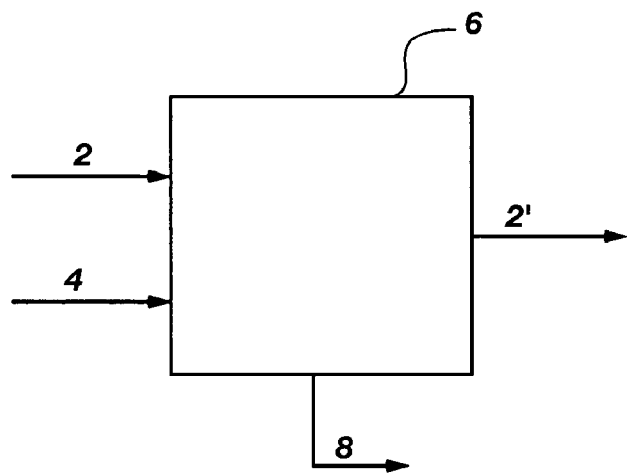
FIG. 1 is a schematic illustration of an embodiment of a system for removing the water from a feedstock stream according to the present invention.

A supercritical solvent is used to remove at least one impurity from a feedstock stream or a product stream. As used herein, the term "impurity" or "impurities" refers to a polar component(s) present in the stream. The impurity may include, but is not limited to, water, dirt, detergents, other polar compounds, and mixtures thereof. The term "impurity-containing stream" is used herein to refer to at least one of the feedstock stream and the product stream. The impurity-containing stream may include at least one nonpolar component and at least one polar component. The supercritical solvent may alter the solubility of the impurity in the impurity-containing stream, enabling the impurity to be removed. Using the supercritical solvent to remove the impurity may be easily incorporated into existing biodiesel plants. While the feedstock stream and the product stream are described herein as starting materials or product streams of a transesterification or esterification reaction to produce biodiesel, the supercritical solvent may be used to remove impurities from other impurity-containing feedstock streams or product streams. For instance, the supercritical solvent may be used to dehydrate an impurity-containing feedstock stream or product stream in the oil refining industry.

The biodiesel produced by the transesterification or esterification reaction may be an alkyl ester or mixtures thereof. An alkyl ester of a glyceride may be produced by a transesterification reaction in which an alcohol is reacted with a glyceride. Alternatively, an alkyl ester of a fatty acid may be produced by an esterification reaction in which an alcohol is reacted with a fatty acid. The chemical reaction for producing the alkyl ester is shown in Equation 1:

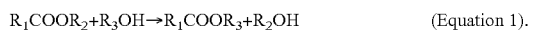

(Equation 1).

In the reaction, the organic ester, $R_1COOR_2$, is reacted with the alcohol, $R_3OH$, to produce the organic ester, $R_1COOR_3$, and the alcohol, $R_2OH$. $R_1$ may be an aliphatic hydrocarbon chain having from four to thirty-six carbon atoms. $R_2$ may be glycerol or another aliphatic hydrocarbon chain having from four to thirty-six carbon atoms. $R_2$ is linked to $R_1$ through an ester ("COO$^-$") linkage. $R_1COOR_2$ may be an acylglycerol, fat, oil, wax, or fatty acid. The acylglycerol may be mono-, di-, or tri-substituted including, but not limited to, a monoglyceride, diglyceride, or triglyceride. If $R_1COOR_2$ is a monoglyceride, diglyceride, triglyceride, fat, or oil, $R_1$ may be the aliphatic hydrocarbon ($C_4$ to $C_{36}$) chain and $R_2$ may be glycerol. If $R_1COOR_2$ is a fatty acid, $R_1$ may be the aliphatic hydrocarbon ($C_4$ to $C_{36}$) chain and $R_2$ may be hydrogen or a metal (i.e., $R_2$ is the salt of the fatty acid ($R_1COO^-M^+$)). $R_1COOR_2$ may also include a free fatty acid ($R_1COO^-$). If $R_1COOR_2$ is a wax, $R_1$ may be an aliphatic hydrocarbon chain linked to $R_2$ through the ester linkage. In one embodiment, $R_1COOR_2$ is a triglyceride, such as an animal fat, animal oil, vegetable fat, vegetable oil, or mixtures thereof. Specific examples of triglycerides include, but are not limited to, peanut oil, rapeseed oil, sesame oil, soybean oil, corn oil, sunflower oil, palm oil, palm kernel oil, coconut oil, safflower oil, olive oil, linseed oil, cotton seed oil, tung oil, castor oil, beef fat, pork fat, fish oil, rendered fat, or mixtures thereof. The triglyceride may also be obtained from waste edible oils, such as restaurant grease, household grease, waste industrial frying oil, or mixtures thereof. In another embodiment, $R_1COOR_2$ is a fatty acid, such as a saturated fatty acid, an unsaturated fatty acid, or mixtures thereof. Specific examples of fatty acids include, but are not limited to, palmitic acid, stearic acid, oleic acid, linoleic acid, or mixtures thereof. $R_3$ may be a short-chain hydrocarbon group, which is attached to a hydroxyl group of the alcohol. $R_3$ may include, but is not limited to, a methyl, ethyl, propyl, or butyl group. The alcohol, $R_3OH$, may include, but is not limited to, methanol, ethanol, n-propanol, isopropanol, n-butanol, isobutanol, t-butanol, or mixtures thereof. The alcohol may be selected depending on the desired products of the reaction.

The feedstock stream that is a source of the glyceride or fatty acid starting material may be a nonpolar liquid, such as a fat, oil, or mixtures thereof. The fat or oil may include, but is not limited to, an animal fat, animal oil, vegetable fat, vegetable oil, or mixtures thereof, such as rapeseed oil, sesame oil, soybean oil, corn oil, sunflower oil, peanut oil, palm oil, palm kernel oil, coconut oil, safflower oil, olive oil, linseed oil, cotton seed oil, tung oil, castor oil, beef fat, pork fat, chicken fat, fish oil, rendered fat, or mixtures thereof. The glyceride or fatty acid starting material may also be obtained from waste edible oils, such as restaurant grease, household grease, waste industrial frying oil, or mixtures thereof. In addition to the glyceride or fatty acid starting material, the feedstock stream may include other components, such as free fatty acids, phospholipids, sterols, water, dirt, detergents, or mixtures thereof. For instance, the feedstock stream may include up to approximately 5% by weight of water, which is dispersed, dissolved, or emulsified in the feedstock stream.

The feedstock stream may be treated to remove the water that is present before using the feedstock stream in the transesterification or esterification reaction. While specific embodiments herein describe removing water from the feedstock stream, the feedstock stream may be treated similarly to remove other impurities (other polar components), such as dirt or detergents. The feedstock stream may be treated by contacting the feedstock stream with the supercritical solvent. Before contacting the supercritical solvent, the feedstock stream may be maintained at ambient temperature and pressure. The supercritical solvent may be a solvent that includes, but is not limited to, carbon dioxide, methane, ethane, propane, butane, pentane, isomers thereof (i.e., n-butane, isobutane, t-butane, n-pentane, isopentane, etc.), methanol, ethanol, propanol, butanol, ethylene, propylene, butylene, pentene, or mixtures thereof. The supercritical solvent may be in a liquid phase, a near-critical liquid phase, or a supercritical phase as the supercritical solvent contacts the feedstock stream. The supercritical solvent may be selected so that it has a critical phase that is obtainable under moderate temperature and pressure conditions. In other words, a critical temperature ("$T_c$") and a critical pressure ("$P_c$") of the supercritical solvent may be moderate, which enables the water to be removed using low amounts of energy. For instance, the $T_c$ may range from approximately −20° C. to approximately 250° C. and the $P_c$ may range from approximately 200 pounds per square inch ("psi") to approximately 5000 psi.

The supercritical solvent may be maintained at or near its $T_c$ and $P_c$ (i.e., at or near a critical point of the supercritical solvent) to remove the water from the feedstock stream. For instance, each of the temperature and pressure may be slightly below, at, or above the $T_c$ and $P_c$. The $T_c$ of the supercritical solvent is the temperature above which the supercritical solvent does not exhibit a distinct gas and liquid phase. The $P_c$ of the supercritical solvent is the minimum pressure needed to liquefy the solvent at a temperature incrementally below its $T_c$. If the supercritical solvent is heated to a temperature above the $T_c$ and pressurized to a pressure above the $P_c$, the supercritical solvent is in the supercritical phase and exhibits properties that are intermediate to those of a gas or a liquid. These properties include, but are not limited to, density, viscosity, surface tension, diffusivity, and solubility. The properties of the supercritical solvent in the supercritical phase may be different than the properties of the same solvent in either a liquid phase or a gas phase. For instance, in the supercritical phase, the supercritical solvent may exhibit a viscosity that is more similar to that of a gas and a density that is more similar to that of a liquid. Due to its high density, low viscosity, and high diffusivity, the supercritical solvent may be used as a solvent or as a gas antisolvent. The supercritical solvent may function in either the solvent or gas antisolvent capacity depending on temperature and pressure conditions at which the supercritical solvent is used. The concentration of the supercritical solvent may also affect whether the supercritical solvent functions as a solvent or gas antisolvent. In addition, the presence of a co-solvent(s) and its concentration may affect whether the supercritical solvent functions as a solvent or gas antisolvent. The supercritical solvent may also exhibit properties similar to its properties in the superoritical phase at temperatures and pressures that are near to the $T_c$ and the $P_c$. For instance, the temperature and pressure conditions may be slightly below each of the $T_c$ and $P_c$ as long as the supercritical solvent exhibits properties similar to those in the supercritical phase. As such, the term "supercritical solvent" as used herein also encompasses a near critical solvent having a temperature and pressure slightly below the $T_c$ and $P_c$.

When used in its solvent capacity, the supercritical solvent may substantially dissolve the nonpolar components of the feedstock stream, such as the fats or oils, into a single, nonpolar fluid phase. As such, a sufficient amount of the supercritical solvent may be added to the feedstock stream to dissolve the nonpolar components. The supercritical solvent may be present at from approximately 10% by volume to greater than approximately 99% by volume relative to components in the feedstock stream.

With the supercritical solvent maintained at or near its $T_c$ and $P_c$, as described above, the feedstock stream and the supercritical solvent may be contacted, causing the polar components of the feedstock stream, such as the water, to become substantially insoluble in the supercritical solvent. As the feedstock stream and the supercritical solvent come into contact, at least one of the temperature and pressure of the resulting mixture may change, decreasing the solubility of the polar components in the feedstock stream. By changing the solubility of the polar components, two phases that are substantially immiscible may form. If the supercritical solvent functions in the solvent capacity, the two phases may be two liquid phases that are substantially immiscible in one another. One of the liquid phases may include the nonpolar components, while the second liquid phase may include the polar components. Similarly, if the supercritical solvent functions in the gas antisolvent capacity, one of the phases may be a liquid phase and the second phase may be a supercritical phase. These two phases may subsequently be separated from one another by conventional techniques, such as by liquid-liquid separation, gravity separation, or centrifugal separation. For instance, if the polar component is water, the phase that includes the water may be heavier than the phase that includes the nonpolar components. As such, the phase that includes the water may be easily separated or drained from the phase that includes the nonpolar components. The separated phases may then be collected. The nonpolar components, such as the fats or oils, may be used as the feedstock stream for the transesterification or esterification reaction, while the polar components are disposed of.

The supercritical solvent and the feedstock stream may be contacted in a vessel, such as a reactor. The vessel may be a batch reactor or a continuous reactor, such as a flask, steel vessel, steel pipe, static mixer, or agitation vessel, as known in the art. The vessel may be formed from glass, steel, stainless steel, nickel alloys, titanium alloys, glass-lined steel, polymer-lined steel, ceramic-lined steel, or mixtures thereof. The vessel may be configured so that the contents of the vessel are heated or pressurized. For instance, the vessel may be heated using a heat exchanger or by heating the vessel externally. The vessel may also include a port or other opening to allow for easy separation of the two immiscible phases.

As shown in FIG. 1, a feedstock stream 2 and a supercritical solvent 4 may be introduced into a vessel 6 and contacted with one another. The vessel 6 may initially be maintained at ambient temperature and pressure conditions and then the temperature and pressure increased so that the supercritical solvent 4 is in its liquid phase, near critical liquid phase, or supercritical phase. Alternatively, the vessel 6 may be maintained at a sufficient temperature and pressure so that the supercritical solvent 4 is introduced into the vessel 6 in its liquid phase, near critical liquid phase, or supercritical phase. The supercritical solvent 4 may dissolve the fats or oils and other nonpolar components of the feedstock stream 2 while the water and other polar components of the feedstock stream 2 may be substantially insoluble in the supercritical solvent 4. As such, the water and the other polar components of the feedstock stream 2 may separate from the nonpolar components of the feedstock stream 2, forming the two immiscible phases described above. A feedstock stream 2' that exits the vessel 6 may be substantially dry (substantially free of water) or substantially free of other polar components. The feedstock stream 2' may be separated from water 8 by conventional techniques, such as by liquid-liquid separation or gravity separation. The feedstock stream 2' may include the triglyceride or fatty acid starting material and may be substantially free of water.

The solubility of the polar components in the feedstock stream 2 may also be reduced by using the supercritical solvent 4 as the gas antisolvent. In addition to the supercritical solvent 4, co-solvents, such as methanol, ethanol, or mixtures thereof, may be used. By dissolving the supercritical solvent 4 into the feedstock stream 2, the supercritical solvent 4 may cause the polarity of the feedstock stream 2 to become very nonpolar, which decreases the solvating power of the feedstock stream 2. A sufficient amount of the supercritical solvent 4 may be dissolved in the feedstock stream 2 by adjusting the pressure of the feedstock stream 2 to make the supercritical solvent 4 very nonpolar. As a result, the polar components may become substantially insoluble in the feedstock stream 2. When used in the gas antisolvent capacity, a smaller quantity of the supercritical solvent 4 may be used compared to using the supercritical solvent 4 in its solvent capacity. For instance, the supercritical solvent 4 may be present at from approximately 1% by volume to approximately 20% by volume of the feedstock stream 2, such as from approximately 1% by volume to approximately 5% by volume of the feedstock stream 2. The supercritical solvent 4 may decrease the solubility of the polar components by disrupting hydrogen bonding and electrostatic interactions in the feedstock stream 2. The supercritical solvent 4 may also expand a volume of the feedstock stream 2. Upon contact, the supercritical solvent 4 and the feedstock stream 2 may form two immiscible phases, with the polar components distributing into one phase and the nonpolar components distributing into a second phase. The two phases may then be separated by conventional techniques, such as by liquid-liquid separation or gravity separation.

Using the supercritical solvent 4 as the gas antisolvent may be substantially as shown in FIG. 1. The feedstock stream 2 and the supercritical solvent 4 may be introduced into the vessel 6 and may be contacted with one another. The pressure within the vessel 6 may be increased to dissolve the supercritical solvent 4 in the feedstock stream 2, causing the feedstock stream 2 to become very nonpolar. The feedstock stream 2 and the water may separate into two phases, with the water and the other polar components of the feedstock stream 2 dropping out of solution. A resulting feedstock stream 2' may be substantially dry and may be separated from the water 8 by conventional techniques, such as by liquid-liquid separation or gravity separation. The feedstock stream 2' may include the triglyceride starting materials, fatty acid starting materials, or mixtures thereof and may be substantially free of water. If the feedstock stream 2' includes triglyceride and fatty acid starting materials, the fatty acids and triglycerides may be separated by adjusting at least one of the temperature and pressure under which the feedstock stream 2' is maintained, causing the fatty acids to form into a separate phase than the triglycerides. The fatty acids and the triglycerides may be separated by conventional techniques. The triglycerides may then be used as the starting material for a transesterification reaction, while the fatty acids may be used as the starting material for an esterification reaction.

The supercritical solvent 4 may be recovered from the feedstock stream 2' by altering at least one of the temperature and pressure. Moderate changes in temperature or pressure may be used to change the solubility of the supercritical solvent 4 in the feedstock stream 2', enabling the supercritical solvent 4 to be easily separated from the feedstock stream 2'. Since only moderate changes are needed, the use of the supercritical solvent 4 to remove the water 8 may be both cost effective and energy efficient.

The resulting dry feedstock stream 2' may be used as the starting material to produce a product stream, such as a product stream including alkyl ester. The product stream may be substantially nonpolar, except in cases where the amount of free fatty acids in the product stream is greater than approximately 50%. For the sake of example only, the alkyl ester may be produced as disclosed in International Application WO 00/05327 to Ginosar et al., the disclosure of which is incorporated by reference herein in its entirety. Alternatively, the alkyl ester may be produced as disclosed in U.S. Pat. No. 7,514,575, entitled PRODUCTION OF BIODIESEL USING EXPANDED GAS SOLVENTS. However, the alkyl ester may also be produced by other conventional techniques. In addition to the alkyl ester, the product stream may include water, glycerol, excess alcohol, intermediate products, and impurities. Some of these reaction products may be purified from the product stream by conventional techniques, such as by filtration, extraction, or distillation, before using the alkyl ester for its intended purpose. For instance, the alkyl ester may be used as biodiesel, which is used as a replacement for, or as an additive to, petroleum diesel fuel. The alkyl ester may also be used as a food preservative, detergent surfactant, herbicide, pesticide diluent, sticking agent, or lubricating additive for hydraulic and transmission fluids. By removing the water from the feedstock stream 2, the transesterification or esterification reaction may be more efficient because less catalyst is consumed and side reactions with water are minimized. As such, the quality of the products in the product stream, such as the alkyl ester, is improved. In addition, removing the water may drive the esterification reaction to completion because it enables the reaction to proceed unhindered (without side reactions). The product stream may be directly used for its intended purpose or, if water is present in the product stream, may be further processed as described below.

Figure 2:
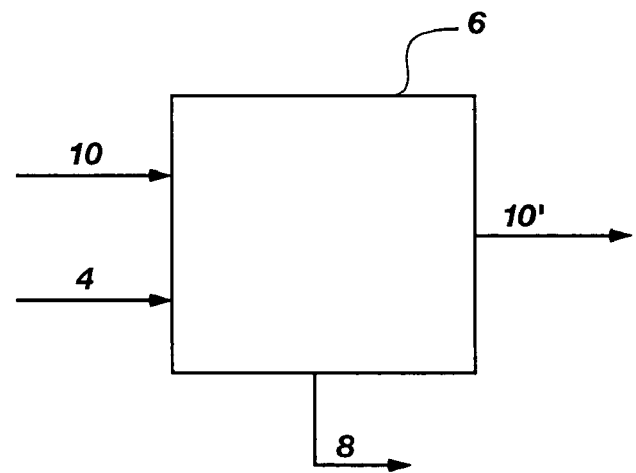
FIG. 2 is a schematic illustration of an embodiment of a system for removing the water from a product stream according to the present invention.

Since water is produced during the esterification reaction, the product stream may include water even if substantially all of the water is removed from the feedstock stream 2 before the reaction. Water may also be present in the product stream due to water washing of the alkyl ester produced by the reaction. To improve the quality of the product stream, the water may be removed in a manner similar to that disclosed above to remove the water from the feedstock stream 2. The supercritical solvent 4 and the product stream may be contacted in the vessel 6. The supercritical solvent 4 may function in either the solvent capacity or the gas antisolvent capacity to remove the water. As shown in FIG. 2, the product stream 10 may be contacted with the supercritical solvent 4 to remove the water. The two immiscible phases that form may then be separated. A product stream 10' may be substantially dry and may be separated from the water 8 by conventional techniques, such as by liquid-liquid separation or gravity separation. The product stream 10' may include the alkyl ester and may be substantially free of water. The product stream 10' may be used for its intended purpose or may be further processed, as known in the art, to remove any remaining impurities.

The supercritical solvent 4 may be recovered from the product stream 10' by altering at least one of the temperature and pressure. Moderate changes in temperature or pressure may be used to change the solubility of the supercritical solvent 4 in the product stream 10', enabling the supercritical solvent 4 to be easily separated from the product stream 10'. Since only moderate changes are needed, the use of the supercritical solvent 4 to remove the water 8 may be both cost effective and energy efficient.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A method of removing impurities from a fluid stream, comprising:
    contacting a fluid stream comprising at least one alkyl ester and at least one impurity with a solvent at or near a critical point thereof;
    adjusting a pressure of the fluid stream to dissolve the solvent into the fluid stream and to form a nonpolar phase and a polar phase comprising the at least one impurity, the polar phase substantially immiscible with the nonpolar phase; and
    removing the polar phase comprising the at least one impurity from the nonpolar phase.

2. The method of claim 1, wherein contacting a fluid stream comprising at least one impurity with a solvent at or near a critical point thereof comprises contacting at least one of a nonpolar feedstock stream and a nonpolar product stream with the solvent.

3. The method of claim 1, wherein contacting a fluid stream comprising at least one impurity with a solvent at or near a critical point thereof comprises contacting at least one of a fat feedstock and an oil feedstock with the solvent.

4. The method of claim 3, wherein contacting at least one of a fat feedstock and a oil feedstock with the solvent comprises contacting an animal fat, animal oil, vegetable fat, vegetable oil, restaurant grease, household grease, waste industrial flying oil, or mixtures thereof with the solvent.

5. The method of claim 1, wherein contacting a fluid stream comprising at least one impurity with a solvent at or near a critical point thereof comprises contacting a fluid stream comprising at least one impurity selected from the group consisting of water, dirt, detergents, and mixtures thereof with the solvent.

6. The method of claim 1, wherein adjusting a pressure of the fluid stream to dissolve the solvent into the fluid stream and to form a nonpolar phase and a polar phase comprising the at least one impurity comprises decreasing solubility of the at least one impurity in the fluid stream.

7. The method of claim 1, wherein contacting a fluid stream comprising at least one impurity with a solvent at or near a critical point thereof comprises contacting the fluid stream with a solvent comprising at least one of carbon dioxide, methane, ethane, propane, butane, pentane, ethylene, propylene, butylene, and pentene.

8. The method of claim 1, wherein contacting a fluid stream with a solvent at or near a critical point thereof comprises substantially dissolving nonpolar components of the fluid stream in the solvent while the at least one impurity is substantially insoluble in the solvent.

9. The method of claim 1, wherein adjusting a pressure of the fluid stream to dissolve the solvent into the fluid stream and to form a nonpolar phase and a polar phase comprising the at least one impurity comprises substantially dissolving fats or oils of the fluid stream in the solvent while at least one impurity comprising water in the fluid stream is substantially insoluble in the solvent.

10. The method of claim 1, wherein adjusting a pressure of the fluid stream to dissolve the solvent into the fluid stream and to form a nonpolar phase and a polar phase comprising the at least one impurity comprises disrupting hydrogen bonding and electrostatic interactions in the fluid stream.

11. The method of claim 1, wherein removing the polar phase comprising the at least one impurity from the nonpolar phase comprises separating the at least one impurity from nonpolar components of the fluid stream.

12. A method of removing at least one polar component from a fluid volume, comprising:
    providing a fluid volume comprising at least one alkyl ester, at least one nonpolar component and at least one polar component in a vessel;
    contacting the fluid volume with a solvent at or near a critical point thereof;
    increasing a pressure within the vessel to dissolve the solvent in the fluid volume and increase a nonpolarity of the fluid volume and to form a first phase comprising the at least one alkyl ester and the at least one nonpolar component and a second phase comprising the at least one polar component; and
    removing the first phase from the second phase to separate the at least one polar component from the fluid volume.

13. The method of claim 12, wherein providing a fluid volume comprising at least one alkyl ester, at least one nonpolar component and at least one polar component comprises providing a water-containing fluid volume.

14. The method of claim 12, wherein providing a fluid volume comprising at least one alkyl ester, at least one nonpolar component and at least one polar component comprises providing an animal fat, animal oil, vegetable fat, vegetable oil, restaurant grease, household grease, waste industrial frying oil, or mixtures thereof.

15. The method of claim 12, wherein increasing a pressure within the vessel to dissolve the solvent in the fluid volume and increase a nonpolarity of the fluid volume and to form a first phase comprising the at least one alkyl ester and the at least one nonpolar component and a second phase comprising the at least one polar component comprises decreasing solubility of the at least one polar component in the fluid volume.

16. The method of claim 12, wherein contacting the fluid volume with a solvent at or near a critical point thereof comprises contacting the fluid volume with carbon dioxide at or above a critical point thereof.

17. The method of claim 12, wherein increasing a pressure within the vessel to dissolve the solvent in the fluid volume and increase a nonpolarity of the fluid volume and to form a first phase comprising the at least one alkyl ester and the at least one nonpolar component and a second phase comprising the at least one polar component comprises substantially dissolving the at least one nonpolar component with the solvent while the at least one polar component is substantially insoluble in the solvent.

18. The method of claim 12, wherein increasing a pressure within the vessel to dissolve the solvent in the fluid volume and increase a nonpolarity of the fluid volume and to form a first phase comprising the at least one alkyl ester and the at least one nonpolar component and a second phase comprising the at least one polar component comprises substantially dissolving a fat or oil with the solvent while the at least one polar component selected from the group consisting of water, dirt, detergents, and mixtures thereof is substantially insoluble in the solvent.

19. The method of claim 12, wherein increasing a pressure within the vessel to dissolve the solvent in the fluid volume and increase a nonpolarity of the fluid volume and to form a first phase comprising the at least one alkyl ester and the at least one nonpolar component and a second phase comprising the at least one polar component comprises disrupting hydrogen bonding and electrostatic interactions in the fluid volume.

20. The method of claim 12, wherein increasing a pressure within the vessel to dissolve the solvent in the fluid volume and increase a nonpolarity of the fluid volume and to form a first phase comprising the at least one alkyl ester and the at least one nonpolar component and a second phase comprising the at least one polar component comprises forming the first phase to be substantially insoluble in the second phase.

21. The method of claim 20, wherein removing the first phase from the second phase to separate the at least one polar component from the fluid volume comprises separating the first phase from the second phase.

22. The method of claim 12, wherein removing the first phase from the second phase to separate the at least one polar component from the fluid volume comprises removing water from the fluid stream.

* * * * *